United States Patent [19]

Sakamoto et al.

[11] Patent Number: 4,774,757

[45] Date of Patent: Oct. 4, 1988

[54] PART INCORPORATING SYSTEM

[75] Inventors: Shunji Sakamoto; Yukio Munenaga, both of Hiroshima, Japan

[73] Assignee: Mazda Motor Corporation, Japan

[21] Appl. No.: 34,041

[22] Filed: Apr. 3, 1987

[30] Foreign Application Priority Data

Apr. 5, 1986 [JP]  Japan ................................. 61-78488

[51] Int. Cl.$^4$ ............................................. B23P 19/00
[52] U.S. Cl. ....................................... 29/702; 29/712; 29/720
[58] Field of Search ................. 29/407, 702, 709, 711, 29/712, 720

[56] References Cited

U.S. PATENT DOCUMENTS

| 4,120,095 | 10/1978 | LeBourg | 29/407 X |
| 4,615,093 | 10/1986 | Tews et al. | 29/709 X |
| 4,654,949 | 4/1987 | Pryor | 29/709 X |
| 4,669,168 | 6/1987 | Tamura et al. | 29/709 X |

FOREIGN PATENT DOCUMENTS 50181 11/1982 Japan .
169987 11/1983 Japan .
206266 11/1984 Japan .

Primary Examiner—Mark Rosenbaum
Assistant Examiner—Frances Chin
Attorney, Agent, or Firm—Gerald J. Ferguson, Jr.

[57] ABSTRACT

A part incorporating system includes a plurality of visual sensors at a detecting station immediately upstream of an incorporating station and respectively detect the positions of reference points in the base material when the base material is supplied to the detecting station, a plurality of second visual sensors at the incorporating station and respectively detect the positions of the reference points when the base material is supplied to the incorporating station, an incorporating unit at the incorporating station to support the part so that the position of the part can be adjusted and which has a fastening device for incorporating the part in the base material, and a control means which calculates the position in which the part is to be incorporated in the base material and controls the incorporating unit to adjust the position of the part. The part incorporating position is basically calculated based on the positions of the reference points detected by the second visual sensors, and when the values of the distances between the reference points detected by the second visual sensors differ from those detected by the first visual sensors by a predetermined value, then the part incorporating position is calculated on the basis of the detected positions of the reference points which provides the values of the distances between the reference points closer to the regular values.

6 Claims, 4 Drawing Sheets

PART INCORPORATING SYSTEM

BACKGROUND OF THE INVENTION

1. Field of the Invention

This invention relates to a part incorporating system for incorporating a part or parts in a base material in, for instance, a vehicle assembly line, and more particularly to such an incorporating system in which a part or parts to be incorporated in a base material is positioned with respect to the base material by the use of a visual sensor like a television camera.

2. Description of the Prior Art

Advances in automation have been made in vehicle frame welding lines and vehicle frame coating lines. However, assembly line automation has been considered to be difficult due to difficulties in positioning parts with respect to base materials in which the part is to be incorporated, e.g., in a vehicle frame. More specifically, if the part is not positioned in place with respect to the base material when the part is incorporated in the base material with a fastener such as a bolt and nut by the use of an automatic incorporating system, the bolt and nut cannot be satisfactorily applied.

In order to overcome such problems, it has been proposed in, for instance, Japanese Unexamined Utility Model Publication No. 58-169987 to adjust the position of the parts with respect to the base material by the use of a TV camera. In this system, when the position of the base material in which the parts are incorporated in the base material fluctuates or the position of the part with respect to the base material fluctuates, the part incorporating position in which the parts are to be incorporated in the base material is detected by the TV camera and the position of the part with respect to the base material is adjusted.

However, this system, has the problem that the detection of the part incorporating position can become incorrect due to displacement of the TV camera and or the influence of external disturbing light, and in such cases the position of the part cannot be correctly adjusted with respect to the base material.

SUMMARY OF THE INVENTION

In view of the foregoing observations and description, the primary object of the present invention is to provide an improved part incorporating system in which the position of the part can be correctly adjusted with respect to the base material in which the part is to be incorporated with less influence from any displacement of the visual sensor (e.g., a TV camera) and/or external disturbing light.

In accordance with the present invention, there is provided a part incorporating system for incorporating a part in a base material comprising a plurality of visual sensors which are disposed in predetermined positions at a detecting station provided immediately upstream of an incorporating station and respectively detect the positions of a plurality of reference points provided in the base material when the base material is supplied to the detecting station, a plurality of second visual sensors which are disposed in predetermined positions at the incorporating station and respectively detect the positions of the reference points provided in the base material when the base material is supplied to the incorporating station, an incorporating unit which is provided at the incorporating station to support the part so that the position of the part can be adjusted and is provided with a fastening device for incorporating the part in the base material, and a control means which compares the values of the distances between the reference points as calculated on the basis of the detected positions of the respective reference points detected by the first visual sensors at the detecting station with the regular values of the corresponding distances to determine whether any of the first visual sensors is in an abnormal condition depending on whether the differences therebetween are within predetermined permissible values, compares the values of the distances between the reference points as calculated on the basis of the detected positions of the respective reference points detected by the first visual sensors determined to be in the normal condition with the values of the corresponding distances as calculated on the basis of the detected positions of the respective reference points detected by the second visual sensors at the incorporating station to calculate the incorporating position of the part in the base material on the basis of the detected positions of the reference points detected by the second visual sensors when the difference therebetween is within a predetermined value with respect to all the values of the distances, and on the basis of, when the difference therebetween is larger than the predetermined value with respect to any of the values of the distances, the detected position of the reference point providing the value of the distance closer to the regular value of the corresponding distance with respect to the reference point related to the value of the distances the difference between which is larger than the predetermined value, and adjusts the position of the part supported on the incorporating unit according to the result of the calculation of the incorporating position of the part.

With this arrangement, the part incorporating position is basically calculated on the basis of the detected positions of the reference point detected by the second visual sensors and when the values of the distances between the reference points as calculated on the basis of the positions of the reference points detected by the second visual sensors differ from those as calculated on the basis of the positions of the reference points detected by the first visual sensors by a predetermined value, the part incorporating position is calculated on the basis of the detected positions of the reference points which provides the values of the distances between the reference points closer to the regular values. Accordingly, even if one or more of the second visual sensors comes to be unable to correctly detect the position of the reference point, the correct position of the reference point can be obtained and the part incorporating position can be correctly calculated. Further, when one or more of the first visual sensors comes to be unable to correctly detect the position of the reference point, the part incorporating position is calculated on the basis of the detected positions of the reference points detected by the second visual sensor.

DESCRIPTION OF THE PREFERRED EMBODIMENT

Now an embodiment of the present invention in which the present invention is applied to incorporate an engine and suspensions in a vehicle frame in a vehicle assembly line will be described in detail with reference to FIGS. 1 to 4.

Figure 1:
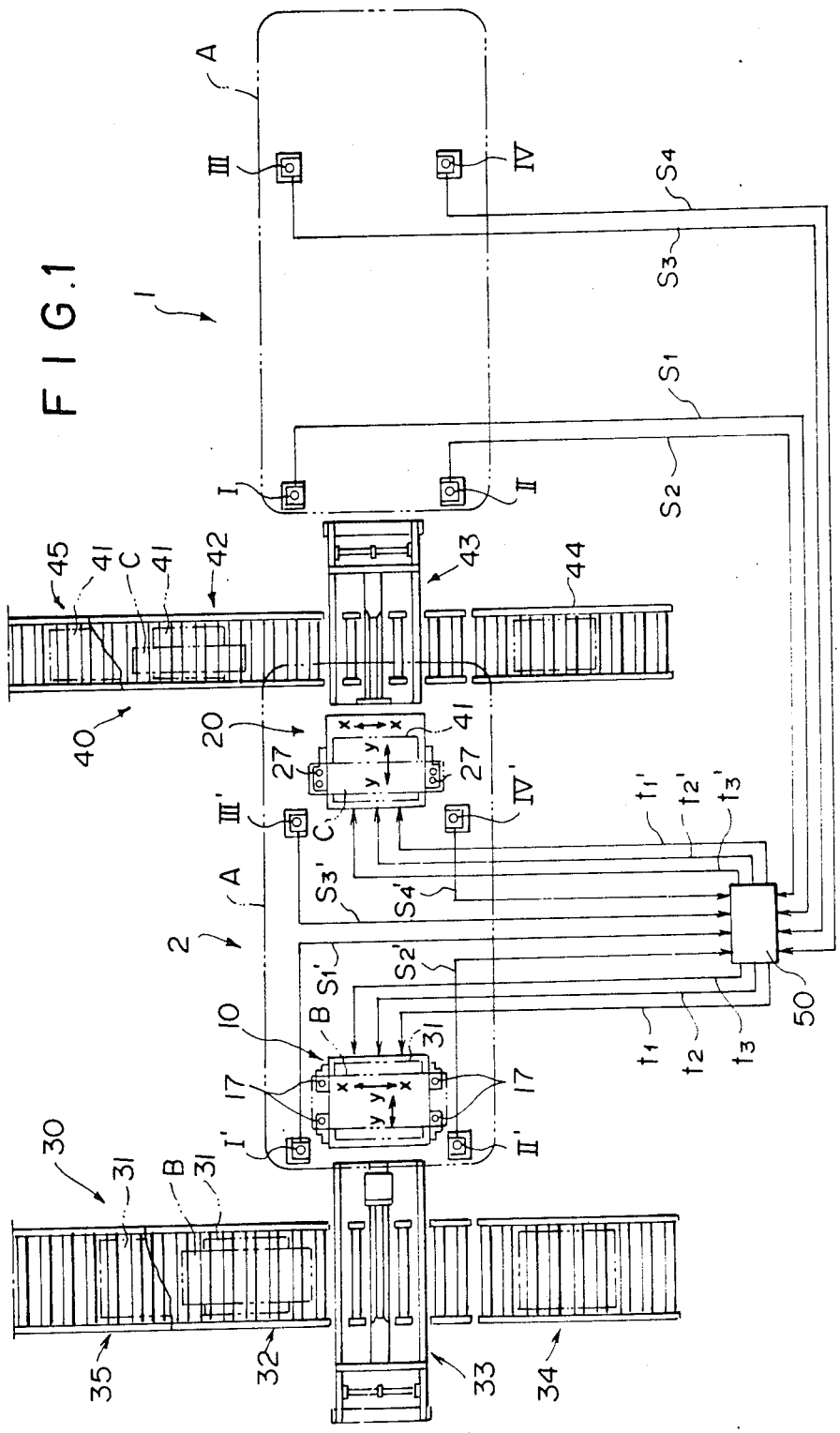
FIG. 1 is a plan view showing a part incorporating system in accordance with an embodiment of the present invention.
Figure 2:
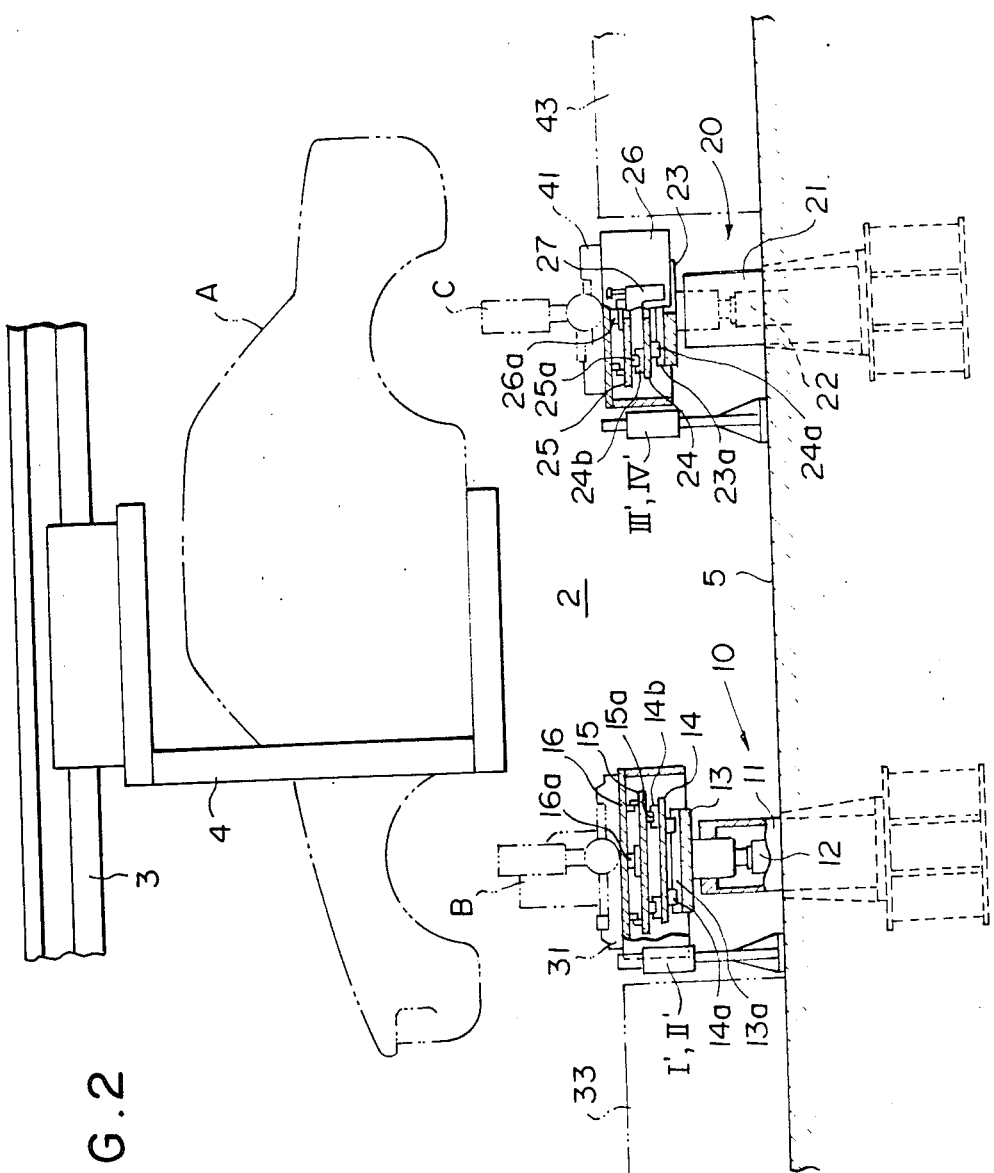
FIG. 2 is an enlarged side view showing the incorporating station of the system.

As shown in FIGS. 1 and 2, a vehicle assembly line is provided with an incorporating station 2 for incorporating an engine-front suspension assembly B and a rear suspension assembly C in a vehicle frame A, and a detecting station 1 disposed immediately upstream of the incorporating station 2. The vehicle frame A is conveyed from the detecting station 1 to the incorporating station 2 supported on a hanger 4 suspended from an overhead conveyor rail 3 and is stopped at the incorporating station 2.

At the incorporating station 2, there are disposed a first incorporating unit 10 for incorporating the engine-front suspension assembly B in the vehicle frame A and a second incorporating unit 20 for incorporating the rear suspension assembly C in the vehicle frame A. Further, the incorporating section 2 is provided with a first supplier 30 for delivering the engine-front suspension assembly B to the first incorporating unit 10 and a second supplier 40 for delivering the rear suspension assembly C to the second incorporating unit 20. The first and second suppliers 30 and 40 are of substantially the same structure. The first supplier 30 comprises a supply conveyor 32 for conveying the engine-front suspension assembly B placed on a table 31 in a direction perpendicular to the conveying direction of the vehicle frame A along the rail 3, a transfer mechanism 33 which is disposed at the downstream end of the supply conveyor 32 to transfer the assembly B on the table 31 to the first incorporating unit 10 together with the table 31 and to recover the empty table 31, a lift mechanism 34 which is movable between an upper position and a lower position and lowers the empty table 31 delivered from the transfer mechanism 33 to the lower position, and a return conveyor 35 which is provided to extend in parallel to the supply conveyor 32 therebelow and conveys in the direction opposite to the supply conveyor 32 the empty table 31 delivered from the lift mechanism 34 in the lower position thereof. Similarly, the second supplier 40 comprises a supply conveyor 42 for conveying the rear suspension assembly C placed on a table 41 in a direction perpendicular to the conveying direction of the vehicle frame A along the rail 3, a transfer mechanism 43 which is disposed at the downstream end of the supply conveyor 42 to transfer the assembly C on the table 41 to the second incorporating unit 20 together with the table 41 and to recover the empty table 41, a lift mechanism 44 which is movable between an upper position and a lower position and lowers the empty table 41 delivered from the transfer mechanism 43 to the lower position, and a return conveyor 45 which is provided to extend in parallel to the supply conveyor 42 therebelow and conveys in the direction opposite to the supply conveyor 42 the empty table 41 delivered from the lift mechanism 44 in the lower position thereof.

The first and second incorporating units 10 and 20 are of substantially the same structure. The first incorporating unit 10 comprises a base 11 fixed to a floor 5, a lift cylinder 12 vertically mounted on the base 11, a support table 13 mounted on the top of the piston rod of the lift cylinder 12, and first to third movable tables 14, 15 and 16 placed one on another in this order on the support table 13. The first or the lower most movable table 14 has slide blocks 14a which are fixed to the lower face thereof and are slidably engaged with guide rails 13a fixed to the upper face of the support table 13 to extend in a direction parallel to the conveying direction of the vehicle frame A (y-y direction), whereby the first movable table 14 is slidable in the y-y direction. The intermediate or the second movable table 15 has guide rails 15a which are fixed to the lower face thereof to extend in a direction x-x perpendicular to the conveying direction of the vehicle frame A and are slidably engaged with slide blocks 14b fixed on the upper face of the first movable table 14, whereby the second movable table 15 is slidable in the x-x direction. The third or the uppermost movable table 16 is supported on a rotational shaft 16a for rotation with respect to the second movable table 15. The first movable table 14 is slid in the y-y direction with respect to the support table 13 driven by a first motor (not shown), the second movable table 15 is slid in the x-x direction with respect to the first movable table 14 driven by a second motor (not shown), and the third movable table 16 is rotated with respect to the second movable table 15 driven by a third motor (not shown). Further, the third movable table 16 is provided with a fastening device 17 for incorporating the engine-front suspension assembly B in the vehicle frame A. Similarly, the second incorporating unit 20 comprises a base 21 fixed to the floor 5, a lift cylinder 22 vertically mounted on the base 21, a support table 23 mounted on the top of the piston rod of the lift cylinder 22, and first to third movable tables 24, 25 and 26 placed one on another in this order on the support table 23. The first or the lower most movable table 24 has slide blocks 24a which are fixed to the lower face thereof and are slidably engaged with guide rails 23a fixed to the upper face of the support table 23 to extend in a direction parallel to the conveying direction of the vehicle frame A (y-y direction), whereby the first movable table 24 is slidable in the y-y direction. The intermediate or the second movable table 25 has guide rails 25a which are fixed to the lower face thereof to extend in a direction x-x perpendicular to the conveying direction of the vehicle frame A and are slidably engaged with slide blocks 24b fixed on the upper face of the first movable table 24, whereby the second movable table 25 is slidable in the x-x direction. The third or the uppermost movable table 26 is supported on a rotational shaft 26a for rotation with respect to the second movable table 25. The first movable table 24 is slid in the y-y direction with respect to the support table 23 driven by a first motor (not shown), the second movable table 25 is slid in the x-x direction with respect to the first movable table 24 driven by a second motor (not shown), and the third movable table 26 is rotated with respect to the second movable table 25 driven by a third motor (not shown). Further, the third movable table 26 is provided with a fastening device 27 for incorporating the rear suspension assembly C in the vehicle frame A.

The detecting station 1 is provided with four first TV cameras I to IV disposed in predetermined positions on the floor 5, and the incorporating station 2 is provided with four second TV cameras I' to IV' disposed in predetermined positions on the floor 5. The four first TV cameras I to IV disposed at the detecting station 1 are positioned to respectively view the four corners of the under side of the vehicle frame A conveyed in the detecting station 1 and stopped there and to detect the positions of reference points (reference holes) a to d (See FIG. 3) provided in predetermined positions of the under side of the vehicle frame A at the four corners. The four second TV cameras I' to IV' disposed at the incorporating station 2 are positioned to respectively view the four corners of the under side of the vehicle frame A conveyed in the incorporating station 2 and stopped there, and to detect the positions of the reference points a to d.

Detecting signals S1 to S4 and S1' to S4' representing the positions of the reference points a to d detected by the first TV cameras I to IV and the second TV cameras I' to IV' are input into a control unit 50. The control unit 50 receives these signals and outputs actuating signals t1 to t3 and t1' to t3' to the first to third motors of the first and second incorporating units 10 and 20. Thereafter, the control unit 50 actuates the fastening devices 17 and 27 of the third movable tables 16 and 26 of the first and second incorporating units 10 and 20.

The operation of the control unit for adjusting the position of the assemblies B and C with respect to the vehicle frame A will be described, hereinbelow.

Figure 3:
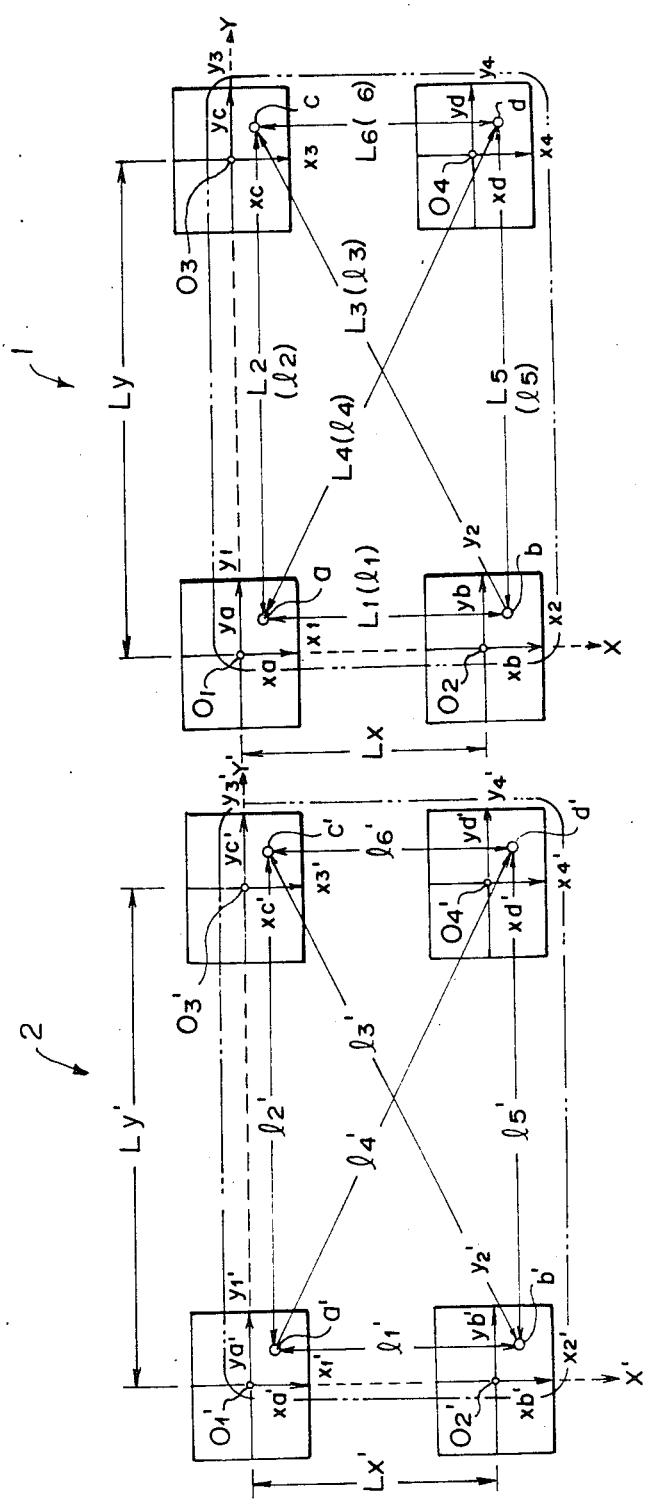
FIG. 3 is a view for illustrating the principle of the present invention.

As shown in FIG. 3, the first TV cameras I to IV are disposed at the detecting station 1 so that the centers $O_1$ to $O_4$ of the image taking surfaces thereof are positioned at the respective corners of a rectangle, one pair of opposed sides of which extend in parallel to the conveying direction of the vehicle frame A (the y-y direction) spaced from each other in the direction perpendicular to the conveying direction of the vehicle frame A (the x-x direction) by a distance Lx, and the other pair of opposed sides of which extend in perpendicular to the conveying direction of the vehicle frame A (the y-y direction) spaced from each other in the direction parallel to the conveying direction of the vehicle frame A (the x-x direction) by a distance Ly. Further, four coordinate systems $(x_1, y_1)$, $(x_2, y_2)$, $(x_3, y_3)$ and $(x_4, y_4)$ respectively having their origins on the centers $O_1$ to $O_4$ are defined. There is further defined a coordinate system $(X, Y)$ having its origin on the center $O_1$, its X-axis on the line passing through the center $O_1$ in perpendicular to the conveying direction of the ehicle frame A and its Y-axis on the line passing through the center $O_1$ in parallel to the conveying direction of the vehicle frame A, the positive side of Y-axis being on the upstream side of X-axis with respect to the conveying direction of the vehicle frame A. Similarly, the second TV cameras I' to IV' are disposed at the incorporating station 2 so that the centers $O_1'$ to $O_4'$ of the image taking surfaces thereof are positioned at the respective corners of a rectangle one pair of opposed sides of which extend in parallel to the conveying direction of the vehicle frame A (the y-y direction) spaced from each other in the direction perpendicular to the conveying direction of the vehicle frame A (the x-x direction) by a distance Lx', and the other pair of opposed sides of which extend in perpendicular to the conveying direction of the vehicle frame A (the y-y direction) spaced from each other in the direction parallel to the conveying direction of the vehicle frame A (the x-x direction) by a distance Ly'. Further, four coordinate systems $(x_1', y_1')$, $(x_2', y_2')$, $(x_3', y_3')$ and $(x_4', y_4')$ respectively having their origins on the centers $O_1'$ to $O_4'$ are defined. There is further defined a coordinate system $(X', Y')$ having its origin on the center $O_1'$, its X'-axis on the line passing through the center $O_1'$ in perpendicular to the conveying direction of the vehicle frame A and its Y'-axis on the line passing through the center $O_1'$ in parallel to the conveying direction of the vehicle frame A, the positive side of Y'-axis being on the upstream side of X'-axis with respect to the conveying direction of the vehicle frame A.

The reference points a to d on the under side of the vehicle frame A are disposed on the respective corners of a rectangle to correspond to the TV cameras I to IV or I' to IV'. The distance $L_1$ to $L_6$ between the reference points a to d are set shown in table 1 with the distances Lx, Ly, Lx' and Ly' being Lx=Lx'=1000 mm and Ly=Ly'=3000 mm.

TABLE 1

$L_1$=1000 mm ($\pm 1$ mm)
$L_2$=3000 mm ($\pm 3$ mm)
$L_3$=3162 mm ($\pm 6$ mm)
$L_4$=3162 mm ($\pm 6$ mm)
$L_5$=3000 mm ($\pm 3$ mm)
$L_6$=1000 mm ($\pm 1$ mm)

Figure 4:
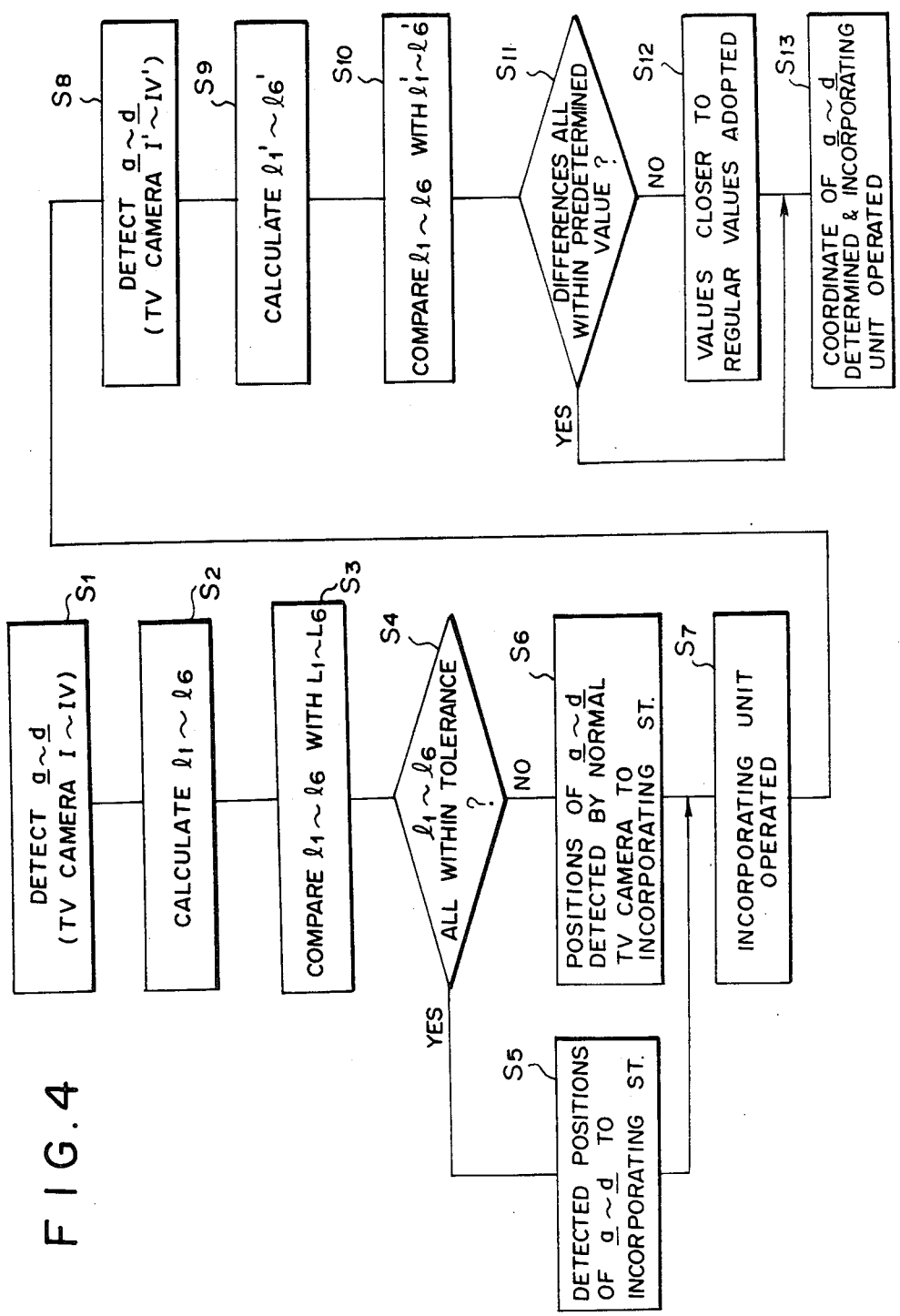
FIG. 4 is a flow chart illustrating the operation of the system of FIG. 1.

When the vehicle frame A is stopped at the detecting station 1, the first TV cameras I to IV detect the respective reference points a to d (step S1 in FIG. 4). For example, it is assumed that the coordinates of the reference points a to d on the corresponding coordinate systems $(x_1, y_1)$ to $(x_4, y_4)$ are as follows.

point a: $(x_a, y_a)$=(10.0, 50.0)
point b: $(x_b, y_b)$=(9.5, 49.5)
point c: $(x_c, y_c)$=(10.0, 52.0)
point d : $(x_d, y_d)$=(10.5 , 51.5)

To the control unit 50 are input the coordinates of the reference points a to d as the signals S1 to S4, and the control unit 50 converts the coordinates of the reference points to d on the coordinate systems $(x_1, y_1)$ to $(x_4, y_4)$ into the coordinates of the coordinate system $(X, Y)$, thereby obtaining the following values.

point a: $(X_a, Y_a)$=(10.0, 50.0)
point b: $(X_b, Y_b)$=(1009.5, 49.5)
point c: $(X_c, Y_c)$=(10.0, 3052.0)
point d: $(X_d, Y_d)$=(1010.5, 3051.5)

The control unit 50 calculates the distances $l_1$ to $l_6$ between the reference points a to d from the coordinates of the points a to d, and compares the obtained values with the regular values $L_1$ to $L_6$. (Steps S2 and S3) The obtained values of the distances $l_1$ to $l_6$ are as shown in table 2, and the difference from the regular values $L_1$ to $L_6$ are shown in the brackets in the table 2.

TABLE 2

$l_1$=999.5 (−0.5)
$l_2$=3002.0 (+2.0)
$l_3$=3164.5 (+2.5)
$l_4$=3163.8 (+1.8)
$l_5$=3002.0 (+2.0)
$l_6$=1000.5 (+0.5)

In this particular example, since the differences between the calculated values $l_1$ to $l_6$ of the distances between the points a to d and the regular values $L_1$ to $L_6$ of the same are all within the tolerances shown in the brackets in table 1, the control unit 50 determines that all the first TV cameras I to IV at the detecting station 1 correctly detect the corresponding reference points a to d (step S4), and then delivers the coordinates of the reference points a to d on the coordinate system $(X, Y)$ to the incorporating station 2. (step S5) On the other hand, when one or more of the calculated values $l_1$ to $l_6$ is outside of the tolerance, the control unit 50 determines the reference point corresponding to the calculated value which is outside of the tolerance. (step S6) Then the TV camera detecting the reference point is determined to be in abnormal condition and the other TV cameras are determined to be in normal condition. The control unit 50 delivers the coordinates of the reference points detected by the TV cameras in the normal condition to the incorporating station 2. Irrespective of whether all the first TV cameras are in the normal condition, the incorporating positions of the assemblies B and C on the vehicle frame A are calculated on the basis of the positions (the coordinates) of the reference points, and then the motors of the first and second incorporating units 10 and 20 are operated to bring the assemblies B and C into the calculated mounting positions. (a primary position adjustment) (step S7)

After detection of the positions of the reference points a to d is completed at the detecting station 1, the vehicle frame A is conveyed to the incorporating station 2, and the positions of the reference points a to d are detected by the second TV cameras I' to IV' at the incorporating section 2. For example, it is assumed that the coordinates of the reference points a to d on the corresponding coordinate systems $(x_1', y_1')$ to $(x_4', y_4')$ are as follows.

point a: (xa', ya')=(13.5, 52.0)
point b: (xb', yb')=(10.0, 51.5)
point c: (xc', yc')=(10.5, 54.0)
point d: (xd', yd')=(11.0, 53.5)

The control unit 50 converts the coordinates of the reference points a to d on the coordinate systems $(x_1', y_1')$ to $(x_4', y_4')$ into the coordinates of the coordinate system (X', Y'), thereby obtaining the following values. (step S8)

point a: (Xa', Ya')=(13.5, 52.0)
point b: (Xb', Yb')=(1010.0, 51.5)
point c: (Xc, Yc)=(10.5, 3054.0)
point d: (Xd, Yd)=(1011.0, 3053.5)

The control unit 50 calculates the distances $l_1'$ to $l_6'$ between the reference points a to d by way of the coordinates of the points a to d, and compares the obtained values with those by way of the coordinates of the points a to d detected in the detecting station 1 and with the regular values $L_1$ to $L_6$. (step S9) The obtained values of the distances $l_1'$ to $l_6'$ are as shown in table 3, and the difference from the regular values $L_1$ to $L_6$ are shown in the brackets ( ), and the difference from the value of the distances $l_1$ to $l_6$ are shown in the brackets [ ].

TABLE 3

$l_1'$=996.5 (−3.5) [3.0]
$l_2'$=3002.0 (+2.0) [0]
$l_3'$=3164.5 (+2.5) [0]
$l_4'$=3162.5 (+0.5) [1.3]
$l_5'$=3002.0 (+2.0) [0]
$l_6'$=1000.5 (+0.5) [0]

Then, the values of the distances $l_1'$ to $l_6'$ obtained in the incorporating station 2 are compared with those obtained in the detecting station 1, and it is determined whether the differences therebetween are smaller than a predetermined value. (step S 10 and step S11) In this case, when one or more of the first TV cameras has been determined to be in an abnormal condition in the step S7, the value or values calculated on the basis of the point or points detected by the first TV camera(s) determined to be in an abnormal condition is omitted, and the other values are compared with those obtained in the incorporating station 2.

When the differences between the values subjected to the comparison are all smaller than the predetermined value, the control unit 50 determines the coordinates of the reference points a to d on the coordinate system (X', Y') in step S13. In this case, it is considered that all the second TV cameras I' to IV' correctly detect the positions of the respective reference points a to b, and accordingly the positions of the reference points a to d detected by the second TV cameras I' to IV' are adopted as the final coordinates, and the incorporating positions of the assemblies B and C are calculated on the basis of the positions of the reference points.

When the incorporating positions of the assemblies B and C determined in the step S13 on the basis of the positions of the reference points detected in the incorporating station 2 deviate from those determined in the step S7 on the basis of the positions of the reference points detected in the detecting station 1, the former incorporating positions are adopted and the first and second incorporating units 10 and 20 are operated to correct the positions of the assemblies B and C.

In the example shown in table 3, the differences between the values $l_1$ and $l_1'$ and between the values $l_4$ and $l_4'$ are not smaller than the predetermined value as shown in the brackets [ ]. Accordingly it is considered that the positions of the reference points a (related to both the values of $l_1$ and $l_4$) detected in the detecting station 1 and the incorporating station 2 differ from each other by a predetermined amount. This suggests the possibility that there is something wrong with the second TV camera I' detecting the point a at the incorporating station 1. Accordingly, if the incorporating positions are calculated on the basis of the position of the reference point a detected by the TV camera I', an incorrect incorporating position may be obtained. Therefore, the control unit 50 adopts one of the combination of the values ($l_1$, $l_2$, $l_4$) detected in the detecting station 1 and the combination of the values ($l_1'$, $l_2'$, $l_4'$) (related to the reference point a) which is generally closer to the regular values (L1, L2, L3), that is, the former combination in this particular example, and calculates the coordinates of the reference point a at the incorporating station 2 (Xa', Ya') on the basis of said one of the combination and the coordinates of the reference points b, c and d obtained in the incorporating station 2, (Xb', Yb'), (Xc', Yc') and (Xd', Yd'). This calculation is made as follows.

$$(Xb'-Xa')^2+(Yb'-Ya')^2=l_1^2 \quad (1)$$

$$(Xc'-Xa')^2+(Yc'-Ya')^2=l_2^2 \quad (2)$$

$$(Xd'-Xa')^2+(Yd'-Ya')^2=l_4^2 \quad (3)$$

In the case of the above example, Xb'=1010.0, Yb'=51.5, Xc'=10.5, Yc'=3054.0 Xd'=1011.0, Yd'=3053.5, $l_1$=999.5 $l_2$=3002.0, $l_4$=3163.8. By substituting these values for the corresponding values in formulae (1), (2) and (3), the coordinates of the point a at the incorporating station 2, (Xa', Ya'), can be obtained.

However, depending on the detecting error of the first TV cameras I to IV and the second TV cameras I' to IV', the above formulae cannot be true. In such a case, two of the three formulae in which out of the values $l_1$, $l_2$ and $l_3$, two values the deviations from the regular values ($L_1$, $L_2$, $L_3$) of which are smaller than that of the other one are included are used and the linear coordinates of the point a are calculated through the two formulae. In this example, the deviations from the regular values $L_1$ and $L_4$ of the values $l_1$ and $l_2$ are smaller than that of the value $l_2$. Accordingly, the linear coordinates of the point a are calculated through the formulae (1) and (3). The two coordinates of the point a thus obtained are substituted for the corresponding values in formula (2) to obtain two values of $l_2$. One of the two coordinates of the point a which provides the value of $l_2$ closer to the regular value $L_2$ may be adopted as the coordinates of the point a at the incorporating station 2, (Xa', Ya').

Thus, whether one or more of the second TV cameras I' to IV' at the incorporating station 2 is in abnormal condition is detected through a comparison of the distances $l_1'$ to $l_2'$ between the reference points a to d as calculated on the basis of the positions of the reference points a to d detected by the second TV cameras I' to IV' and the distances $l_1$ to $l_6$ between the reference points a to d as calculated on the basis of the positions of the reference points a to d, and the position of the reference point at the incorporating station 2 detected by the second TV camera which is determined to be in abnormal condition is calculated on the basis of the distances between the reference points selected through a comparison with the regular values of the distances between the reference points, whereby the positions of all the reference points a to d at the incorporating station 2 can be determined with a high accuracy. Then the incorporating positions of the assemblies B and C are calculated on the basis of the positions of the reference points a to d thus determined, and the incorporating units 10 and 20 are operated to bring the assemblies into the respective incorporating positions. Accordingly, the assemblies B and C can be incorporated in the vehicle frame A correctly by the fastening devices 17 and 27 even if one or more of the TV cameras is in an abnormal condition, Since the positions of the reference points a to d are detected at the detecting station 1 before the vehicle frame A is fed to the incorporating station 2, the range over which the reference points a to d must be searched for may be relatively narrow, and accordingly, detection of the reference points a to d at the incorporating station 2 can be performed with a high accuracy and in a relatively short time, whereby the time for which the vehicle frame A is stopped at the incorporating station is shortened.

We claim:

1. A part incorporating system for incorporating a part in a base material, comprising;
    a plurality of first visual sensors which are disposed in predetermined positions at a detecting station provided immediately upstream of an incorporating station and which respectively detect the positions of a plurality of reference points provided in the base material when the base material is supplied to the detecting station,
    a plurality of second visual sensors which are disposed in predetermined positions at the incorporating station and which respectively detect the positions of the plurality of reference points provided in the base material when the base material is supplied to the incorporating station,
    an incorporating means which is disposed at the incorporating station to support the part so that the position of the part can be adjusted, the incorporating means having an incorporating device for incorporating the part in the base material,
    and a control means for calculating the values of the distances between a plurality of predetermined reference points on the basis of the detected positions of the respective reference points by the first and second visual sensory and for comparing corresponding values of the distance between the ones of the plurality of reference points with a plurality of predetermined values of the corresponding distances to determine whether any of the first visual sensors is in an abnormal condition depending on whether the differences therebetween are within predetermined limits when no abnormal condition exists and control means also comparing the values of the distances between the reference points as calculated on the basis of the detected positions of the respective ones of the plurality of reference points detected by the first visual sensors with respective corresponding values of the corresponding distances between ones of the plurality of reference points as calculated on the basis of the detected positions of the respective reference points detected by the second visual sensors at the incorporating station to calculate the respective differences therebetween and determining whether each of the corresponding differences is within corresponding respective predetermined values with respect to each of the values of the distances, and when any one of the differences therebetween is larger than the corresponding respective predetermined value, the corresponding respective pedvalue of the distance is selected which is closer to the predetermined value of the respective corresponding distance with respect to the reference point, and adjusts the position of the part supported in the incorporating means according to the result of the calculation of the incorporating position of the part using the selected values of the respective corresponding ones of the plurality of reference points.

2. A part incorporating system as defined in claim 1 in which said base material is a vehicle frame.

3. A part incorporating system as defined in claim 2 in which said reference points are defined by holes formed on the under side of the vehicle frame.

4. A part incorporating system as defined in claim 3 in which said holes are at least three in number.

5. A part incorporating system as defined in claim 4 in which said incorporating means comprises first and second incorporating units, the first incorporating unit being adapted to work on the front portion of the vehicle frame and the second incorporating unit being adapted to work on the rear portion of the vehicle frame.

6. A part incorporating system as defined in claim 5 in which said first incorporating unit incorporates the engine and the front suspension and the second incorporating unit incorporates the rear suspension.

* * * * *